US012705953B2

(12) United States Patent
Macke et al.

(10) Patent No.: US 12,705,953 B2
(45) Date of Patent: Aug. 11, 2026

(54) AUTOMATICALLY ITERATING HAND COUNTS IN ELECTRONIC GAMING ENVIRONMENTS

(71) Applicant: Primero Games, LLC, Norcross, GA (US)

(72) Inventors: Michael M. Macke, Duluth, GA (US); Barry W. Rutherford, Duluth, GA (US); Mark C. Nizdil, Duluth, GA (US)

(73) Assignee: PRIMERO GAMES, LLC, Norcross, GA (US)

( * ) Notice: Subject to any disclaimer, the term of this patent is extended or adjusted under 35 U.S.C. 154(b) by 225 days.

(21) Appl. No.: 18/433,624

(22) Filed: Feb. 6, 2024

(65) Prior Publication Data

US 2025/0252819 A1 Aug. 7, 2025

(51) Int. Cl.
*G07F 17/32* (2006.01)

(52) U.S. Cl.
CPC ........ *G07F 17/326* (2013.01); *G07F 17/3244* (2013.01)

(58) Field of Classification Search
CPC ............. G07F 17/3225; G07F 17/3234; G07F 17/3237; G07F 17/3239; G07F 17/3241; G07F 17/3244; G07F 17/3246; G07F 17/3248; G07F 17/3255; G07F 17/3258; G07F 17/326; G07F 17/3267; G07F 17/3288; G07F 17/3295; G07F 17/3293
See application file for complete search history.

(56) References Cited

U.S. PATENT DOCUMENTS

| | | | | |
|---|---|---|---|---|
| 2021/0134119 A1* | 5/2021 | Acres | .................. | G07F 17/3267 |
| 2021/0183205 A1* | 6/2021 | Meister-Gronau | ... | G06Q 20/045 |
| 2022/0343727 A1* | 10/2022 | Acres | .................. | G07F 17/3239 |
| 2023/0051449 A1* | 2/2023 | Froy | .................. | G07F 17/3237 |
| 2023/0148405 A1* | 5/2023 | Acres | ...................... | G07F 17/34 463/16 |
| 2023/0334944 A1* | 10/2023 | Macke | ................ | G07F 17/3244 |
| 2025/0157294 A1* | 5/2025 | Macke | ................ | G07F 17/3267 |

* cited by examiner

*Primary Examiner* — Omkar A Deodhar
(74) *Attorney, Agent, or Firm* — Bradley Arant Boult Cummings LLP; Adam J. Thompson, Esq.

(57) ABSTRACT

Disclosed herein are systems and methods for using computing devices combined with memory to facilitate enhancements to video games. The computing device can receive a selection of a game feature via a user interface. The computing device can iteratively decrease a current credits value on the wagering game based on a bet amount for a wagering game and generate a current iteration outcome of the wagering game comprising a plurality of current iteration indicia. In each iteration, the computing device can determine whether the current iteration outcome results in a losing combination of the plurality of current iteration indicia and autonomously perform another iteration without user input in response to the current iteration outcome being a losing combination.

18 Claims, 6 Drawing Sheets

AUTOMATICALLY ITERATING HAND COUNTS IN ELECTRONIC GAMING ENVIRONMENTS

TECHNICAL FIELD

The present systems and processes relate generally to technology enabling electronic generation of outcomes for wagering games to increase hand counts in an electronic gaming environment.

BACKGROUND

In many gaming scenarios, local jurisdictions enact a certain set of conditions to be met prior to patrons receiving payment from a gaming device. For example, patrons may need to reach a minimum hand count prior to receiving a payout. Such conditions can result in patrons losing interest after a certain number of losing outcomes. In some cases, skill-based games are presented to the patron only after a losing outcome in a wagering game. Patrons may be unable to cash out an entertainment device/wagering game because certain thresholds may not be met.

Therefore, there is a long-felt but unresolved need for a system or process that allows patrons to meet threshold conditions while minimizing wait times to cash out by increasing the rate of games played.

SUMMARY

Briefly described, and according to one embodiment, aspects of the present disclosure generally relate to systems and processes for efficiently generating outcomes of wagering games in an electronic gaming environment. Aspects of the present disclosure generally relate to systems and methods for managing gameplay in a wagering game used by patrons.

Aspects of the present disclosure are related to systems and methods for accelerating hand count accumulation in electronic gaming systems. In an exemplary embodiment, patrons of a gaming establishment are unable to receive payouts until the patrons have accumulated a sufficient number of games played (also referred to herein as a "hand count"). In effect, this could result in a patron winning on a first wagering game played, and the patron may not be able to immediately retrieve their winnings. Instead, patrons may be need to play additional games, many of which may be losses. According to the present system, when losing outcomes are generated, the gaming device can continue to the next game without the need to display the result to the user or receive additional user input, thereby reducing the time needed to achieve the minimum hand count. This process can continue until either the minimum hand count is reached, or the patron wins the wagering game. This expedited play process can be configurable by the patron to increase an enjoyment of the game while still playing within the rules for paying out.

In one embodiment, patrons can play skill-based games associated with winning and/or losing outcomes to the wagering game. It may be desirable for the patron to be presented with all skill-based games of a particular session in an immediate sequential manner. For example, the gaming device can automatically iterate through a predetermined number of games, generating random outcomes for each one. As used herein, the term "automatic" can refer to being performed by a computing device with no user interaction or limited user interaction. The gaming device can store the outcomes of these games in a queue, and, for the winning outcomes, additionally store a set of skill based game features. After generating all of the random outcomes to the wagering game, the gaming device can proceed to present the patron with the appropriate sequence of skill-based games. This approach is beneficial because it can reduce the amount of time the patron needs to spend in order to achieve the hand count conditions to receive a payout.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
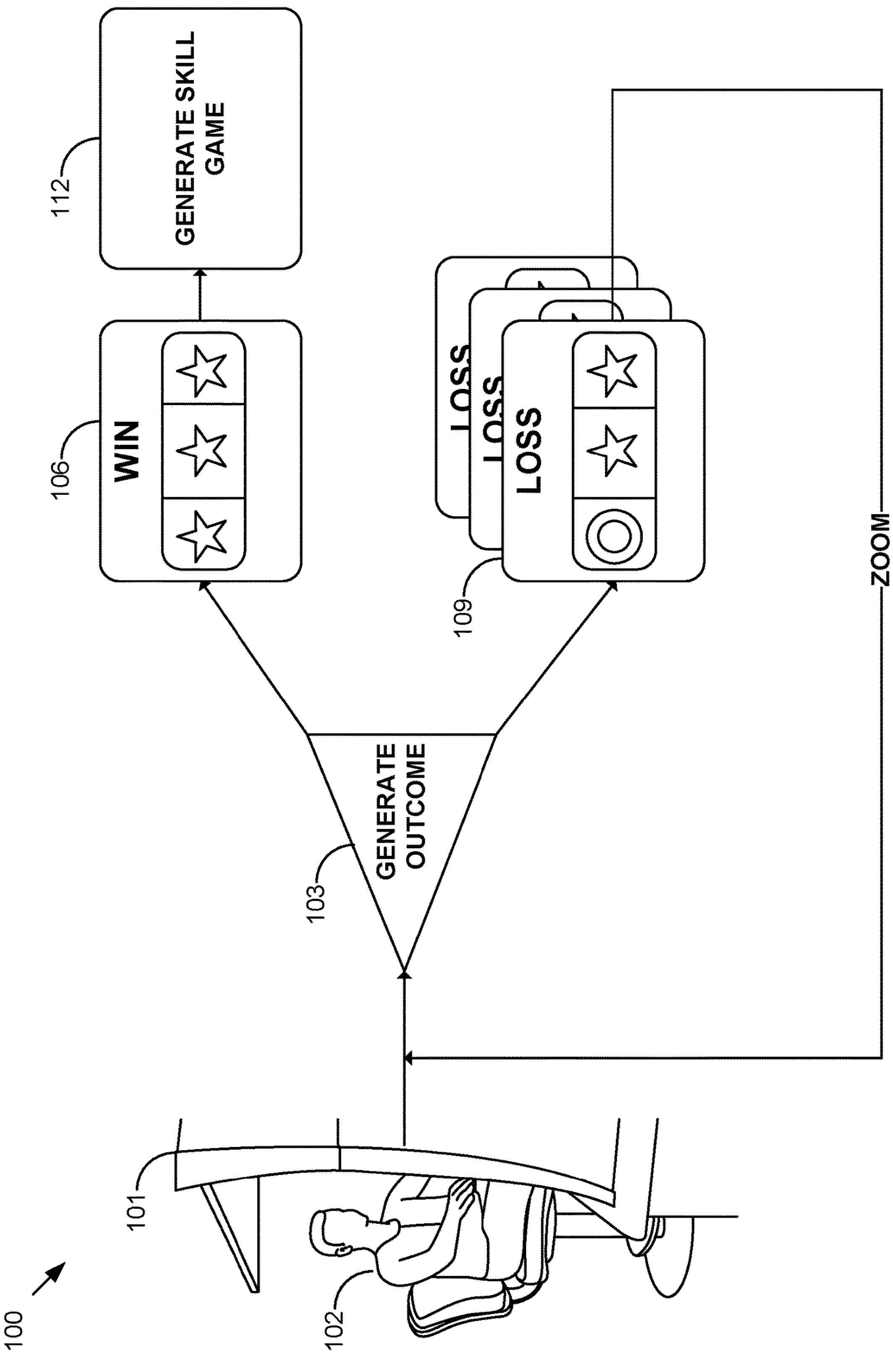
FIG. 1 illustrates an exemplary system for iteratively generating outcomes according to various embodiments of the present disclosure

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure are related to systems and methods for accelerating hand count accumulation in electronic gaming systems. In an exemplary embodiment, patrons of a gaming establishment are unable to receive payouts until the patrons have accumulated a sufficient number of games played (a hand count). In effect, this means that if a patron wins the first wagering game played, the patron may not be able to immediately retrieve their winnings. Instead, patrons may play additional games to obtain games played to facilitate cashing out the coin in on the gaming device, many of which will likely be losses. According to the present system, when losing outcomes are generated, the gaming device can continue to the next game without the need to display the result to the user or receive additional user input, thereby reducing the time needed to achieve the minimum hand count. This process can continue until either the minimum hand count is reached, or the patron wins the wagering game.

In an additional exemplary embodiment, patrons can play skill-based games associated with specific outcomes to the wagering game, such as winning outcomes and/or losing outcomes. It may be desirable for the patron to be presented with all skill-based games associated with winning outcomes of a particular session in immediate sequential manner. In one embodiment, the system may generate a series of skill-based games individually corresponding to losing games played during the particular session. In other words, the gaming device can automatically iterate through a predetermined number of games and generating random outcomes for each one. The gaming device can store the outcomes of these games in a queue, and, for specific outcomes, store a set of skill based game features in a queue for play at a subsequent time. After generating all of the random outcomes to the wagering game, the gaming device can proceed to present the patron with the appropriate sequence of skill-based games from the queue. This approach is beneficial because it can reduce the amount of time the patron needs to pay attention to different aspects of the game in order to achieve the hand count conditions to receive a payout and focus only on the skill-based games.

EXEMPLARY EMBODIMENTS

Referring now to the figures, for the purposes of example and explanation of the fundamental processes and components of the disclosed systems and processes, reference is made to FIG. 1, which illustrates an exemplary, high-level overview 100 of one embodiment of the gaming system. As will be understood and appreciated, the exemplary, high-level overview 100 shown in FIG. 1 represents merely one approach or embodiment of the present system, and other aspects are used according to various embodiments of the present system.

As will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown.

The system 100 can include a gaming device 101 used by a patron 102. The gaming device 101 is configured to produce a wagering game for the patron 102. The wagering game can be a game of chance wherein the patron 102 bets a number of credits on a randomly generated outcome at step 103. For example, the wagering game can be a game wherein three symbols are randomly generated and the patron 102 wins the wagered number of credits if the three generated symbols are matching, otherwise the patron 102 loses the wagering game.

The gaming device 101 can receive a selection of a game feature from the patron 102. The selection can be made via a button, a joystick, a lever, a touchscreen, paired device such as a smart phone, or other input device. Selections can be presented to the patron via a user interface. The user interface can be displayed on a liquid crystal display (LCD) screen, a gas plasma-based flat panel display, an organic light emitting diode (OLED) display, an electrophoretic ink (E ink) displays, an LCD projector, or other type of display device. The game feature can include various information, for example, a type of game, a size of wager, or a number of attempts. As an example, the game feature can include a selection of a winning condition. The winning condition can include a number of generated symbols which must match in order to achieve a win. The winning condition can include a specific pay table or parameter associated with a specific pay table, such as a specific denomination and game. At step 103, the gaming device can generate an outcome of a wagering game. The outcome can include indicia 104 to indicate whether the outcome is a winning or losing combination. The indicia 104 can include one or more symbols. The gaming device can determine whether the indicia represent a winning combination 106 or a losing combination 109. A winning combination 106 can be defined based on whether a certain number of the generated indicia are matching. In the event of a losing combination 109, the gaming system 203 can repeat step 103, generating a new outcome of the wagering game without prompting the patron 102. In the event of a winning combination 106, the gaming device 101 can generate and display a skill-based game 112 for the patron. The skill-based game can be a game which tests the patron's memory, dexterity, or other skill.

Figure 2:
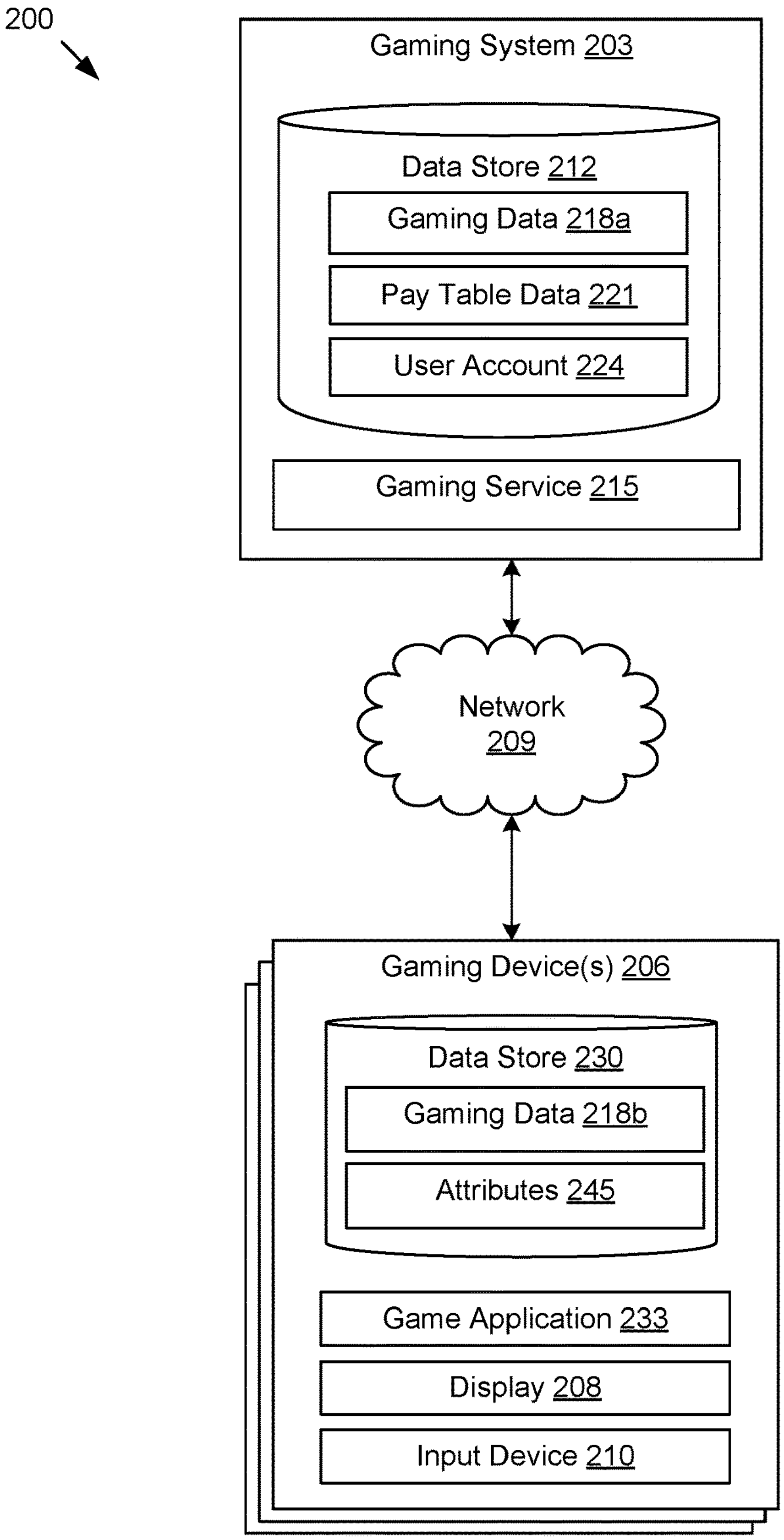
FIG. 2 illustrates an exemplary networked environment according to various embodiments of the present disclosure

Referring now to FIG. 2, shown is a networked environment 200 according to various embodiments of the present disclosure. The networked environment 200 can include a gaming system 203 communicatively coupled to one or more gaming devices 206 via one or more networks 209. The networks 209 can include the internet, intranets, extranets, wide area networks (WANs), local area networks (LANs), wired networks, wireless networks, or other suitable networks, or any combination of two or more such networks. The gaming system 203 can include a data store 212. The data store 212 can include one or more internal and/or external data stores. The data store 212 can include volatile or nonvolatile memory or a combination thereof. The data store can include random access memory (RAM), a solid state device (SSD), or other suitable memory system. The data store 212 can store multiple types of data. The types of data can include gaming data 218, pay table data 221, user account data 224, and other data relevant for client use. The gaming data 218 can include a total number of games played, a list of all game outcomes generated, timing data for games played, a hand count for each gaming device, or other meter data. The pay table data 221 can include a list of payouts for each combination of indicia generated by a gaming device 206. The user account data 224 can include identifying information for users. The identifying information for users can include an identification number, a name, or other identifying feature. The user account data 224 can include a current credits balance for a user. The user account data 224 can include a gaming history for a user. For example, user account data 224 can include information as to how many games a user has played, an amount of credits wagered on each game by the user, and a set of timestamps describing when the user played games.

The gaming system 203 communicates with the network 209 via a gaming service 215. The gaming service 215 can coordinate one or more gaming devices 206 via the network 209. The gaming service can provide updated information to the gaming devices 206. Information served by the gaming service 215 can include current pay tables, credit counts, and updated user data.

The gaming device 206 can include a data store 230. The data store 230 can store multiple types of data. The types of data can include gaming data 219 and attributes 245. The gaming data 219 can include pay tables, graphical data, game types, hand count data, credit count data, and other types of data. Attributes 245 can include graphical preferences, wager amounts, and feature selections, and other attributes. The gaming device 206 can further be configured to store a hand count value corresponding to the number of game outcomes generated. The hand count value can be stored in the data store 230 inside the gaming device 206, or communicated via a network 209 to the gaming system 203.

The gaming device 206 can include one or more game applications 233. The game application(s) 233 can be customizable. The game application(s) 233 can include multiple types of games. The game types can include wagering games and skill-based games. The gaming device 206 can include a display 208. The display 208 can be a liquid crystal display (LCD) screen, a gas plasma-based flat panel display, an organic light emitting diode (OLED) display, an electrophoretic ink (E ink) displays, an LCD projector, or other type of display device. The gaming device 206 can include one or more input devices 210. The input device(s) 210 can be a mouse, a trackpad, a keyboard, a set of buttons, a joystick, a touch screen, or other suitable input device. The input device can be used by the patron to select game features via a user interface.

Figure 3:
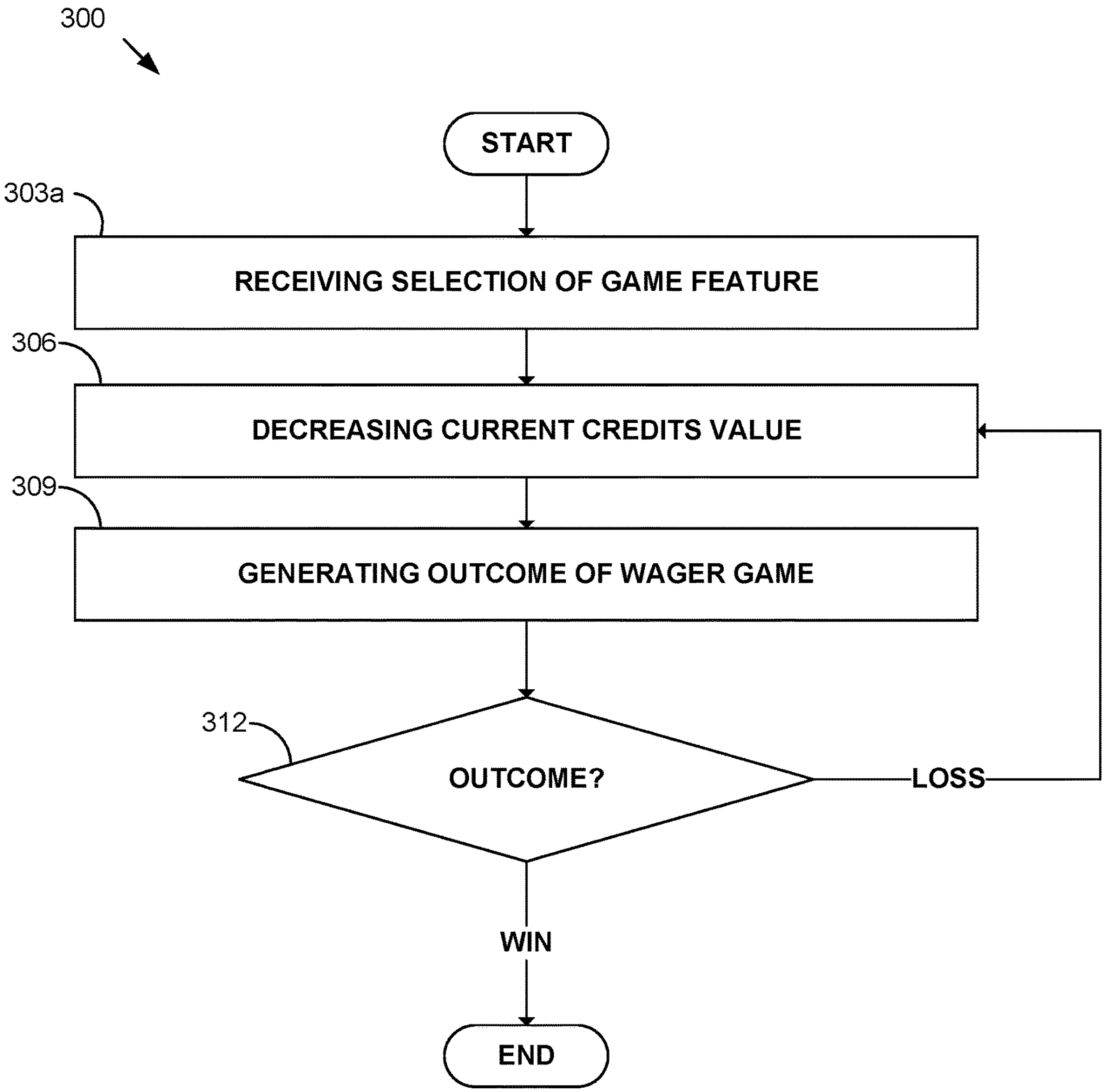
FIG. 3 illustrates an exemplary process performed in the networked environment according to various embodiments of the present disclosure.

Referring now to FIG. 3, shown is a process 300 according to various embodiments of the present disclosure. At step 303*a*, the process 300 includes receiving a selection of a gaming feature from a patron. For example, the gaming device 206 can receive a selection of one or more gaming features from a patron. The gaming feature can include a selection of a button corresponding to playing through a set number of games or playing until a win occurs. The gaming device 206 can receive a selection from a patron to play through 10 games, 20 games, 100 games, or another quantity of games.

The gaming feature can include a type of game, a number of attempts, a wager amount, or a difficulty level. The feature selection can be shown to the patron via the display. The gaming device 206 can render a user interface on the display 208. The user interface can have one or more user selectable widgets. The widgets can include one or more buttons to select a specific game, denomination, increase or decrease a bet amount, play with a max bet, and play until the next win or until a set number of games are played. The selection can be made by an input device 210. The gaming device 206 can receive selections of the play features from a current patron. The auto play features as described herein can include a number of games to play, a denomination to use for the games, a bonus feature for the games to be played, an option for whether to play bonus games or skill-based games in real-time as they occur or queue the games until a termination event.

At step 306, the process 300 can include decreasing a current credit value by a bet amount. For example, the gaming device 206 can decrease a current credits value by a bet amount. The credits value can be stored as a coin in meter on a memory internal to the gaming device or on a storage device externally coupled to the gaming device. In some embodiments, the bet amount can be fixed for a specific game or set of games. In other embodiments, the gaming device 206 can provide an option for a patron to select the bet amount from within a predetermined range. The bet amount can be limited to integer increments of a base bet value (e.g., 5, 10, or 15 credits). In some embodiments, the bet amount can be any number of credits.

The credits value can be represented in memory as an integer or floating point value.

At step 309, the process 300 can include generating an outcome of a wagering game. For example, the gaming device 206 can generate an outcome of a wagering game. The wagering game can be a series of rotating slot reels, a matching game, a bonus game, a card game, or other game of chance. The outcome can be characterized by a series of indicia. The indicia can include one or more symbols from a set of symbols along a reel strip that rotate. In some embodiments, the reel strip may individually correspond to a one or more positions on the wagering game (e.g., a specific position on a wagering game, a column on the wagering game, a row on the wagering game, or another set of positions. The symbols can be graphic representations of characters, numbers, letters, shapes, or other representations. The indicia can be used to determine whether the current iteration outcome is a winning combination or losing combination of indicia. As an example, if the generated indicia include a set of symbols along a pay line that match with a pay table, the outcome can be a win. The indicia can be symbols, letters, numbers, sounds, or other indicators. The indicia can be displayed to the patron or hidden from the patron.

At step 312, the process 300 can include determining an outcome of the wagering game. For example, the gaming device 206 can determine an outcome of the wagering game by comparing the indicia at each position along each pay line to winning combinations of a pay table. The indicia can be used to determine the outcome of the wagering game. The outcome can be a win or a loss. The outcome can be determined based on factors related to the indicia. The outcome can be determined based on whether the indicia are matching or whether all of the generated indicia are unique. If the outcome is a loss, the gaming device returns to step 306 and begins another iteration. The repetition of steps 306, 309, and 312 can be done without notifying the user. Steps 306, 309, and 312 can repeat iteratively until the generated outcome is a winning combination of indicia. The repetition can be done rapidly. For example, the gaming device 206 can render the wagering game during each iteration at a speed of five, ten, or fifty times as fast as during single play mode. The relative speed of iterative mode versus single play mode can be determined by the user or by the gaming device. If the generated outcome is a win, the iterative process can be terminated and the result can be displayed to the user.

The gaming device 206 can additionally generate a skill-based game immediately upon identifying the current iteration outcome as a winning or losing combination of indicia. In this case, the gaming device stops generating new iterations of the wagering game, displays the result to the patron, and generates a skill-based game. Skill-based games can include games which test the memory of the patron. Skill-based games can have features which are in part determined by the winning outcome. Features of memory games can include, for example, a number of objects or symbols to memorize, a library of objects or symbols from which to choose, a format or arrangement of objects or symbols to be memorized. Skill-based games can alternatively include games which test the dexterity of the patron. Features of dexterity-based games can include, for example, a size of objects to be selected, a speed at which objects move, and a visual contrast of objects on a screen. Skill-based game features can further include, for example, a difficulty level, a type of game, or an additional wager amount.

Figure 4:
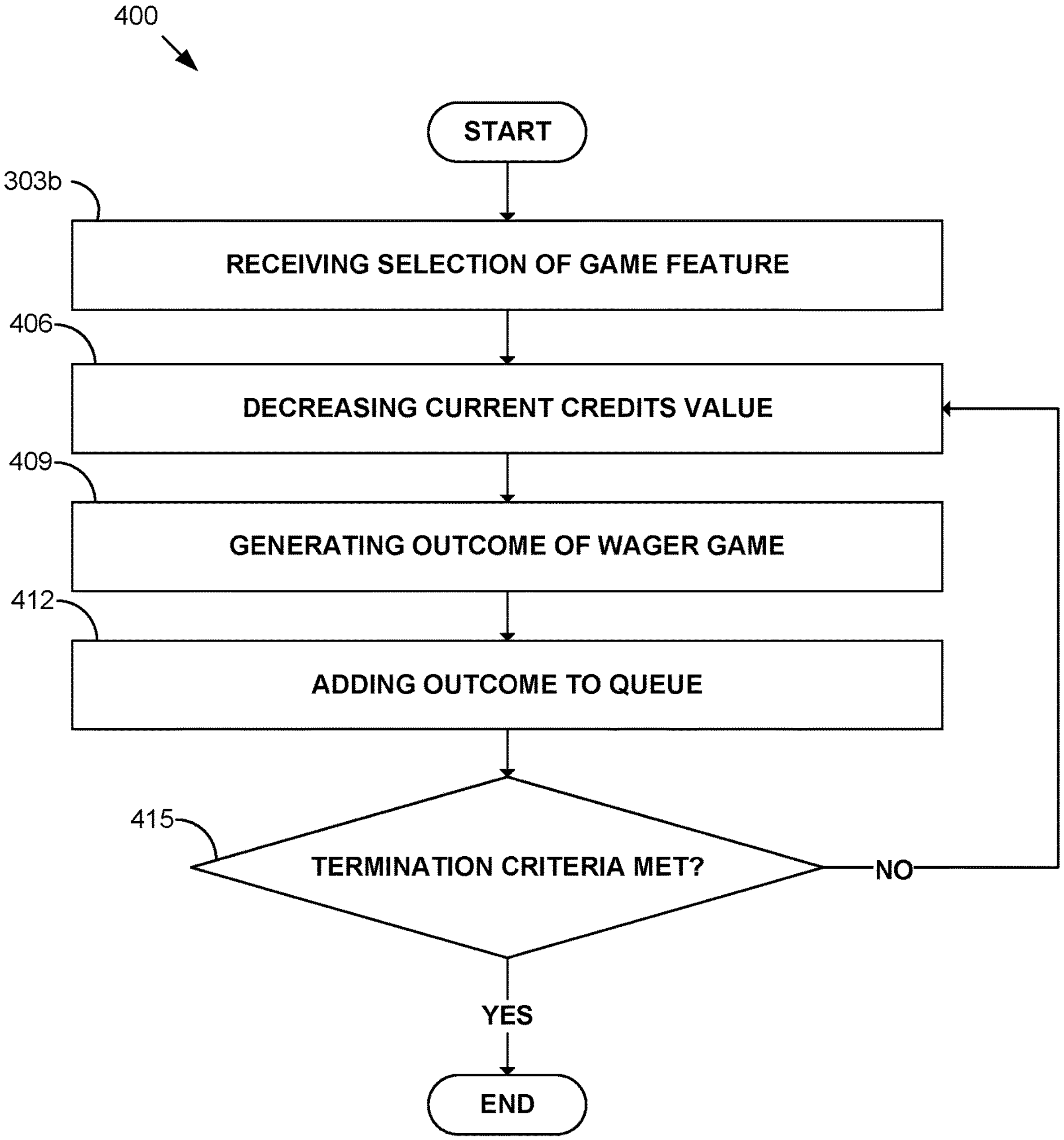
FIG. 4 illustrates an exemplary process performed in the networked environment according to various embodiments of the present disclosure.

Referring now to FIG. 4, shown is a process 400 according to various embodiments of the present disclosure. At step 303*b* the process 400 can include receiving a selection of a game feature from a patron. For example, the gaming device 206 can receive a selection of one or more gaming features from a patron.

At steps 406-412, the process 400 can include an iterative sequence of decreasing the current credits value (step 406), generating an outcome of a wagering game (step 409), and adding the outcome to a queue (step 412). For example, the gaming device can iteratively decrease the current credits value, generate an outcome of a wagering game, and add the outcome to a queue. The queue can include a list of all game outcomes played by the current patron. The queue can include bet amounts for each game played. The queue can include a list of skill-based game features which correspond directly to the outcomes of the wagering games. For example, the specific outcome of a given wager game can correspond to a specific difficulty level of a skill-based game. A less likely winning combination can correspond to a more difficult skill-based game. The features of the skill based game which correspond to the outcomes of the wagering game can be saved in the queue in the same order as the outcomes were generated.

At step 415, process 400 can include determining whether or not a set of termination criteria has been met. For example, the gaming device 206 can determine whether or not termination criteria have been met. The termination criteria can be a credit balance threshold, a number of iterations, a time limit, a bonus threshold, a mystery jackpot threshold, a progressive jackpot threshold, or other suitable criteria. In one embodiment, the termination criteria can be a predefined number of iterations. The predefined number of iterations can be selected by a user, determined by the gaming device, or dynamically set based on external factors. External factors can include the time of day, the current credit count, or the total win or loss amount for the patron.

The termination criteria can be a minimum credit balance. For example, the gaming device 206 can terminate the iterative process if the current credit balance falls below a bet amount. The bet amount threshold can be selected by the patron, or set by the gaming system. The iterative process can be terminated by user input. The user input can be the press of a button, the pull of a lever, or other input method.

Once the termination criteria have been met, the gaming device 206 can render outcome information on the display 208. Specifically, the gaming device 206 can present the patron with information regarding the number of wins and number of losses, the current credit balance, the availability of any payout, whether there are any skill-based games to be played, and any other relevant information. The gaming device 206 can further be configured to allow a payout after the iterative process has been terminated. The gaming device 206 can limit the payout value of the wagering game to a multiple of the hand count value. For example, the payout of the wagering game can be limited to a multiple of 5, 10, or 20 times the hand count value.

Figure 5:
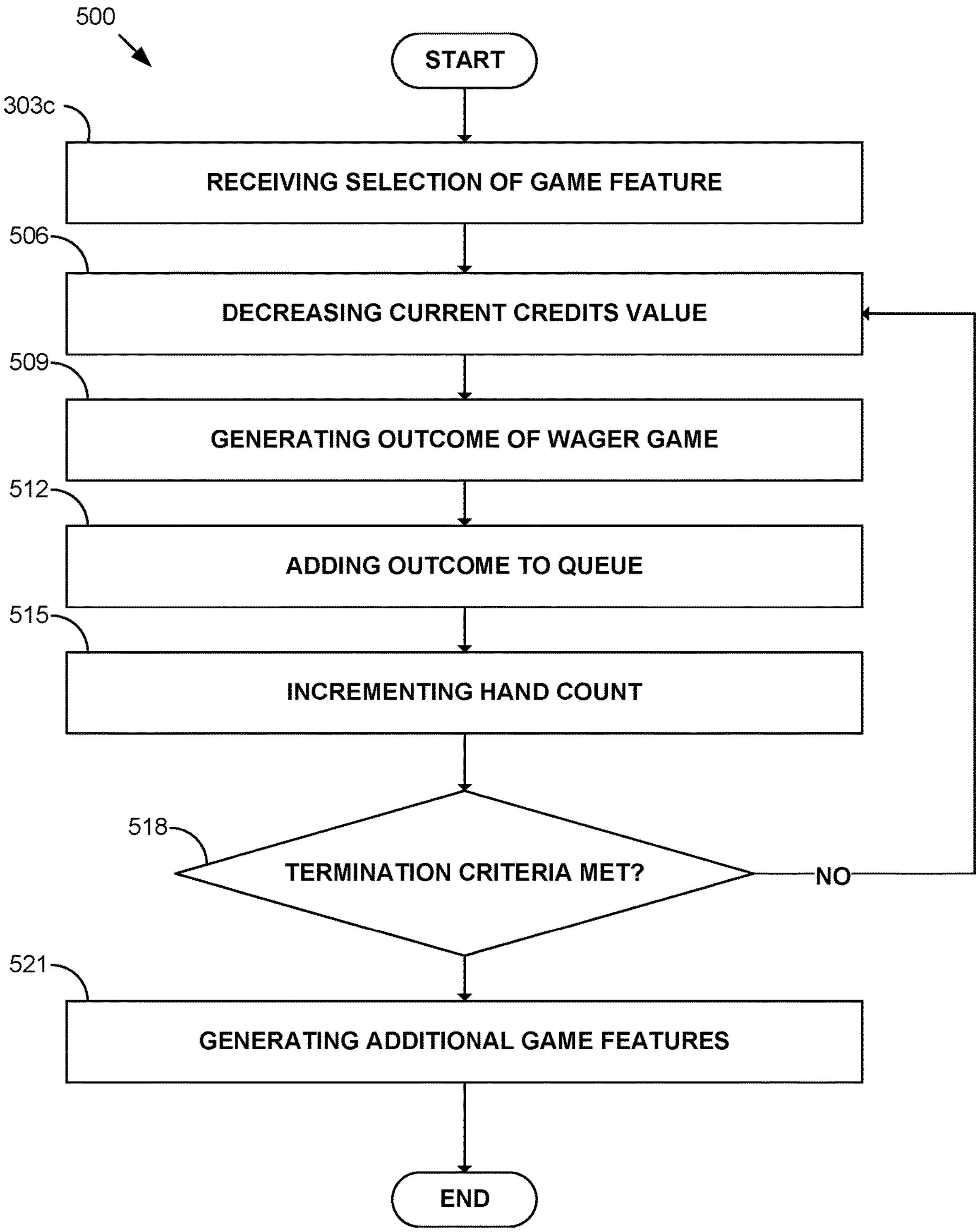
FIG. 5 illustrates an exemplary process performed in the networked environment according to various embodiments of the present disclosure.

Referring now to FIG. 5, shown is a process 500 according to various embodiments of the present disclosure. At step 303*c*, process 500 includes receiving a selection of a game feature from a patron. For example, the gaming device 206 can receive a selection of a game feature from a patron by way of an input device 210.

At step 506, process 500 includes decreasing the current credits value by a bet amount. For example, the gaming device 206 can decrease the current credits value by a bet amount. At step 509, process 500 includes generating an outcome of a wagering game. For example, the gaming device 206 can generate an outcome of a wagering game. The outcome can be determined based on a set of indicia as described above in reference to FIG. 1.

At step 512, process 500 includes adding the generated outcome to a queue. For example, the gaming device 206 can add the generated outcome to a queue. The queue can be a list of outcomes of wagering games played in a session. The queue can be stored internally in a data store of the gaming device or externally in a data store of a gaming system communicatively coupled to the gaming device via a network. The queue can include information about wager amounts, wins and losses, credit counts, time spent playing, and other relevant information.

At step 515, process 500 includes incrementing a hand count. For example, the gaming device 206 can increment a hand count. The hand count can be a number of outcomes generated or games played by a particular patron. The hand count can be stored locally in a data store of the gaming device. The hand count can be communicated to the gaming system via a network.

At step 518, process 500 includes determining whether or not a set of termination criteria have been met. For example, the gaming device 206 can determine whether or not a set of termination criteria have been met. The termination criteria can be a credit balance threshold, a number of iterations, a time limit, a minimum number of hand counts or other suitable criteria. In one embodiment, the gaming device 206 can determine whether the termination criteria are met by querying the gaming system 203 for a particular piece of meter data (e.g., a current hand count value for the current patron). If the meter data obtained from the gaming system satisfies the termination criteria (e.g., the hand count is greater than a minimum hand count threshold), the gaming device 206 can proceed to step 521. If the termination criteria have not been met, the gaming device 206 can repeat an iteration of steps 503-515.

If termination criteria have been met, at step 521 process 500 includes generating a set of additional game features. For example, the gaming device 206 can generate additional game features. Additional game features can include skill-based game features. Skill-based game features can include, for example, a difficulty level, a type of game, an additional wager amount, a number of objects to be memorized, or a speed of object motion on the display. The gaming device 206 can generate skill-based games in a number and species which correspond directly to the generated outcomes of the wagering game which have been stored in the queue. In an example scenario in which the termination criteria is a minimum hand count of ten and a patron has played ten games (e.g., the patron's hand count is ten), the gaming device has randomly generated ten outcomes of the wagering game. All ten outcomes can be stored in a queue. If three of the generated outcomes are winning combinations, the generated outcomes can be stored in the queue along with a set of skill-based game features which correspond to specific outcomes. As such, the queue will include ten randomly generated outcomes, including seven losses and three wins, with corresponding sets of skill-based game features. Since the termination criteria have been achieved, the gaming device 206 can proceed to generate and display skill-based games corresponding to the features in the queue, in an order corresponding to the order of games played.

The gaming device 206 can determine whether a game of skill is successful based on inputs from the patron. Upon determining that the outcome of the skill-based game is successful, the gaming device 206 can award the patron with credits based on the total number of credits decreased during the iterative process. For example, the gaming device 206 can reward the patron with 104% of the total number of credits decreased for losing combinations during the iterative process.

Figure 6:
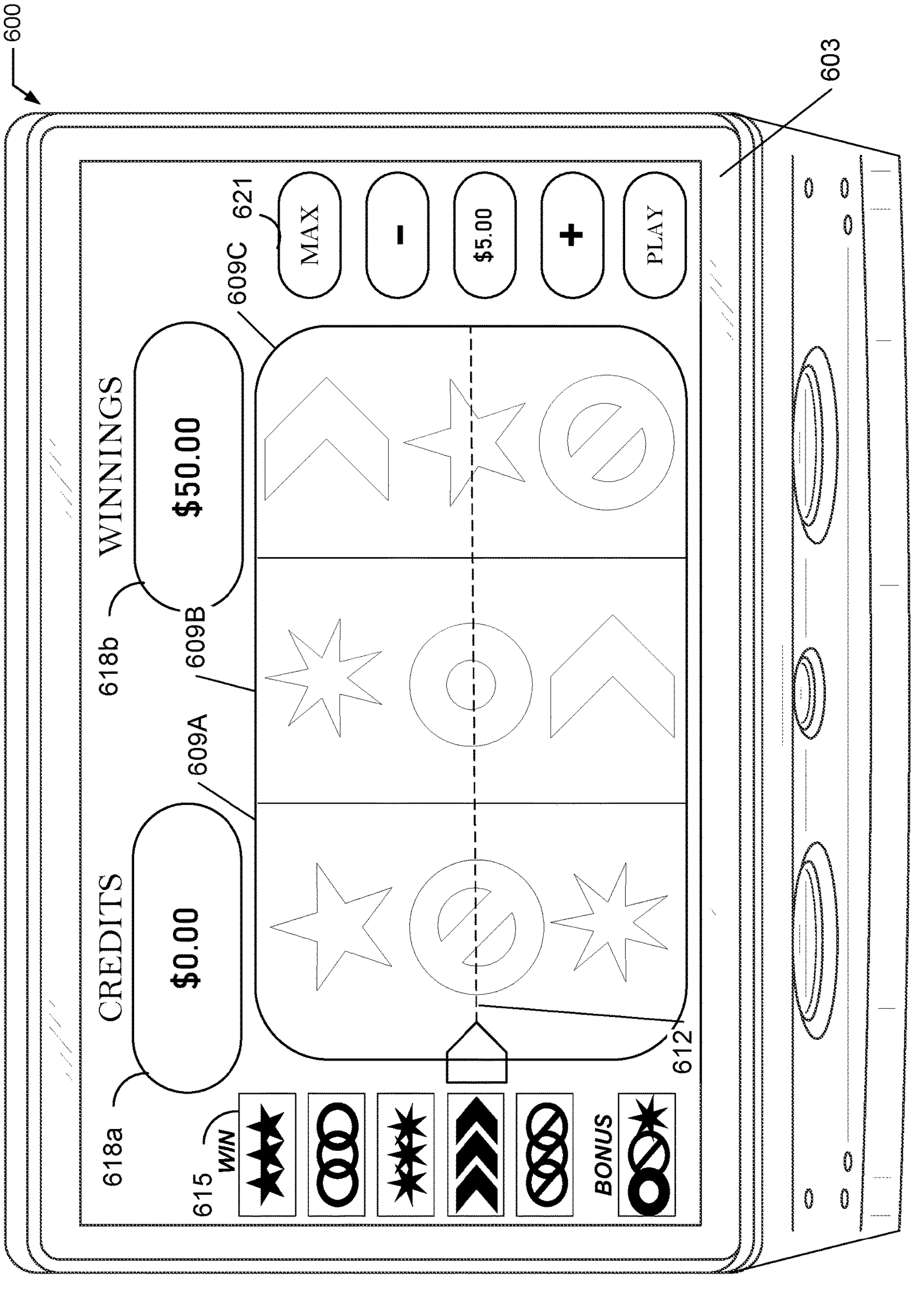
FIG. 6 illustrates an exemplary display according to various embodiments of the present disclosure.

Referring now to FIG. 6, shown is an exemplary display 600 according to various embodiments of the present disclosure. The display can include a screen 603. The screen can be an LED screen, a liquid crystal display, a heat capacitive touch screen, or any other suitable display screen. The display 600 can include reel strips 609A, 609B, and 609C with indicia on them. The indicia can include one or more symbols from a set of symbols. In some embodiments, the reel strip may individually correspond to a one or more positions on the wagering game (e.g., a specific position on a wagering game, a column on the wagering game, a row on the wagering game, or another set of positions. The symbols can be graphic representations of characters, numbers, letters, shapes, or other representations. The indicia can be used to determine whether the current iteration outcome is a winning combination or losing combination of indicia. As an example, if the generated indicia include a set of symbols along a pay line 612 that match with a pay table, the outcome can be a win.

The display 600 can include a graphical depiction of a pay table 615. The graphical representation of the pay table 615 can be a set of symbols with information which corresponds to winning and losing outcomes. The pay table 615 can be selected by a patron or preset by the gaming device 206. The display 600 can include information about various meters relevant for the patron. For example, the display 600 can include a credits field 618*a* wherein the patron is presented with their current credit balance. The display 600 can include a winnings field 618*b* wherein the user is presented with the total winnings for their current gaming session. The display 600 can include additional fields related to the patron's gaming account, the current status of any jackpots associated with the gaming device, and other information related to the gaming device.

The display 600 can include input buttons 621. Input buttons 621 can be touch screen buttons or mechanical buttons. Input buttons 621 can provide the user with options including wagering amounts, number of game outcomes to generate, and other gaming options.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

Clause 1. A system, comprising: a memory; and at least one computing device in communication with the memory, the at least one computing device being configured to at least: receive a selection of a game feature via a user interface; iteratively: decrease a current credits value on the wagering game based on a bet amount for a wagering game; generate a current iteration outcome of the wagering game comprising a plurality of current iteration indicia; determine whether the current iteration outcome results in a losing combination of the plurality of current iteration indicia; and in response to the current iteration outcome being a losing combination, autonomously perform another iteration without user input.

Clause 2. The system of clause 1 or any other clause herein, wherein the at least one computing device is further configured to, in response to the current iteration outcome being a winning combination: add data describing the current iteration outcome to a queue; and autonomously perform additional iterations without user input until a predefined count of iterations are performed.

Clause 3. The system of clause 1 or any other clause herein, wherein the at least one computing device is further configured to generate a plurality of skill-based game features individually corresponding to a gaming outcome from the queue subsequent to iterating through the predefined count of iterations.

Clause 4. The system of clause 3 or any other clause herein, wherein the plurality of skill-based game features are generated sequentially in an order that the plurality of skill-based game features were won.

Clause 5. The system of clause 1 or any other clause herein, wherein the at least one computing device is further configured to, in response to the current iteration outcome being a winning combination: generate a skill-based game feature on a user interface; and stop iterating through additional wagering games.

Clause 6. The system of clause 1 or any other clause herein, wherein the at least one computing device is further configured to increment a hand count value for each current iteration outcome generated.

Clause 7. The system of clause 6 or any other clause herein, wherein the at least one computing device is further configured to limit a payout value of the wagering game to a multiple of the hand count value.

Clause 8. A method, comprising: receiving, via one of one or more computing devices, a selection of a game feature via a user interface; decreasing, via one of the one or more computing devices, a current credits value on the wagering game based on a bet amount for a wagering game; generating, via one of the one or more computing devices, a first outcome of the wagering game comprising a plurality of first indicia; determining, via one of the one or more computing devices, that the first outcome results in a losing combination of the plurality of first indicia; and in response to the first outcome being a losing combination, autonomously: decreasing, via one of the one or more computing devices, the current credits value on the wagering game based on the bet amount for the wagering game; and generating, via one of the one or more computing devices, a second outcome of the wagering game comprising a plurality of second indicia.

Clause 9. The method of clause 8 or any other clause herein, further comprising: in response to the second outcome being a losing combination, autonomously decreasing, via one of the one or more computing devices, the current credits value on the wagering game based on the bet amount for the wagering game; and generating, via one of the one or more computing devices, a third outcome of the wagering game comprising a plurality of third indicia.

Clause 10. The method of clause 8 or any other clause herein, further comprising: determining, via one of the one or more computing devices, that the current credit value fell below a bet amount; and terminating, via one of the one or more computing devices, an iterative process responsive to the current credit value falling below a bet amount.

Clause 11. The method of clause 8 or any other clause herein, further comprising: receiving, via one of the one or more computing devices, a selection of a play feature via the user interface; generating, via one of the one or more computing devices, a third outcome of the wagering game comprising a plurality of third indicia; and displaying, via one of the one or more computing devices, a result of the third outcome comprising the plurality of third indicia until additional input is received.

Clause 12. The method of clause 11 or any other clause herein, wherein the selection of the play feature corresponds to a first user interface widget and the selection of the game feature corresponds to a second user interface widget, and the second user interface widget is separate from the first user interface widget.

Clause 13. The method of clause 8 or any other clause herein, further comprising determining, via one of the one or more computing devices, that the second outcome results in a winning combination of the plurality of second indicia.

Clause 14. A non-transitory computer-readable medium embodying a program that, when executed by at least one computing device, causes the at least one computing device to: receive a selection of a game feature via a user interface; and perform an iterative process comprising: decreasing a current credits value on the wagering game based on a bet amount for a wagering game; generating a current iteration outcome of the wagering game comprising a plurality of current iteration indicia; determining whether the current iteration outcome results in a losing combination of the plurality of current iteration indicia; and in response to the current iteration outcome being a losing combination, autonomously performing another iteration of the iterative process without user input.

Clause 15. The non-transitory computer-readable medium of clause 14 or any other clause herein, wherein the iterative process further comprises: in response to the current iteration outcome being a winning combination: performing a game of skill via a display; increasing the current credits value by an award amount based at least on part on a result of the game of skill; and performing another iteration of the iterative process without user input.

Clause 16. The non-transitory computer-readable medium of clause 14 or any other clause herein, wherein the program further causes the at least one computing device to: subsequent to the iterative process, generate a game of skill on a user interface; determine whether the game of skill is successful based on a plurality of inputs; and in response to the game of skill being successful, award a particular amount of credits to the current credits value based on a sum of a quantity of credits decreased for losing combinations during the iterative process.

Clause 17. The non-transitory computer-readable medium of clause 16 or any other clause herein, wherein the particular amount of credits is equal to 104% of the sum of the quantity of credits decreased for losing combinations during the iterative process.

Clause 18. The non-transitory computer-readable medium of clause 14 or any other clause herein, wherein the program further causes the at least one computing device to render the wagering game for each iteration in the iterative process on a display at a first speed exceeding a second speed of the wagering game in a single play mode.

Clause 19. The non-transitory computer-readable medium of clause 18 or any other clause herein, wherein the first speed is at least five times faster than the second speed.

Clause 20. The non-transitory computer-readable medium of clause 14 or any other clause herein, wherein the iterative process further comprises: receiving a user input during the iterative process; and terminating the iterative process on completion of a current iteration wagering game in response to receiving the user input.

These and other aspects, features, clauses, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

What is claimed is:

1. A system, comprising:

a memory; and at least one computing device in communication with the memory, the at least one computing device being configured to at least:

render a user interface on a display comprising at least one user selectable widgets;

receive a selection of a game feature corresponding to one of the user selectable widgets via an input device associated with the user interface;

iteratively:

decrease a current credits value on a wagering game based on a bet amount for a wagering game;

generate a current iteration outcome of the wagering game comprising a plurality of current iteration indicia;

determine whether the current iteration outcome results in a losing combination of the plurality of current iteration indicia;

in response to the current iteration outcome being a losing combination, autonomously perform another iteration without user input; and in response to the current iteration outcome being a winning combination:

generate a skill-based game feature on the user interface; and stop iterating through additional wagering games.

2. The system of claim 1, wherein the at least one computing device is further configured to, in response to the current iteration outcome being a winning combination:

add data describing the current iteration outcome to a queue.

3. The system of claim 2, wherein the at least one computing device is further configured to generate a plurality of skill-based game features individually corresponding to a gaming outcome from the queue subsequent to iterating through a predefined count of iterations.

4. The system of claim 3, wherein the plurality of skill-based game features are generated sequentially in an order that the plurality of skill-based game features were won.

5. The system of claim 1, wherein the at least one computing device is further configured to increment a hand count value for each current iteration outcome generated.

6. The system of claim 5, wherein the at least one computing device is further configured to limit a payout value of the wagering game to a multiple of the hand count value.

7. A method, comprising:

rendering, via one of one or more computing devices, a user interface on a display comprising at least one user selectable widgets;

receiving, via one of the one or more computing devices, a selection of a game feature corresponding to one of the user selectable widgets via an input device associated with the user interface;

decreasing, via one of the one or more computing devices, a current credits value on a wagering game based on a bet amount for a wagering game;

generating, via one of the one or more computing devices, a first outcome of the wagering game comprising a plurality of first indicia;

determining, via one of the one or more computing devices, that the first outcome results in a losing combination of the plurality of first indicia;

in response to the first outcome being a losing combination, autonomously:

decreasing, via one of the one or more computing devices, the current credits value on the wagering game based on the bet amount for the wagering game; and generating, via one of the one or more computing devices, a second outcome of the wagering game comprising a plurality of second indicia; and in response to the second outcome being a winning combination:

generating, via one of the one or more computing devices, a skill-based game feature on a user interface; and stopping, via one of the one or more computing devices, iterating through additional wagering games.

8. The method of claim 7, further comprising:

in response to the second outcome being a losing combination, autonomously decreasing, via one of the one or more computing devices, the current credits value on the wagering game based on the bet amount for the wagering game; and generating, via one of the one or more computing devices, a third outcome of the wagering game comprising a plurality of third indicia.

9. The method of claim 7, further comprising:

determining, via one of the one or more computing devices, that the current credit value fell below a bet amount; and terminating, via one of the one or more computing devices, an iterative process responsive to the current credit value falling below a bet amount.

10. The method of claim 7, further comprising:

receiving, via one of the one or more computing devices, a selection of a play feature via the user interface;

generating, via one of the one or more computing devices, a third outcome of the wagering game comprising a plurality of third indicia; and displaying, via one of the one or more computing devices, a result of the third outcome comprising the plurality of third indicia until additional input is received.

11. The method of claim 10, wherein the selection of the play feature corresponds to a first user interface widget and the selection of the game feature corresponds to a second user interface widget, and the second user interface widget is separate from the first user interface widget.

12. The method of claim 7, further comprising determining, via one of the one or more computing devices, that the second outcome results in the winning combination of the plurality of second indicia.

13. A non-transitory computer-readable medium embodying a program that, when executed by at least one computing device, causes the at least one computing device to:

render a user interface on a display comprising at least one user selectable widgets;

receive a selection of a game feature corresponding to one of the user selectable widgets via an input device associated with the user interface; and perform an iterative process comprising:

decreasing a current credits value on a wagering game based on a bet amount for a wagering game;

generating a current iteration outcome of the wagering game comprising a plurality of current iteration indicia;

determining whether the current iteration outcome results in a losing combination of the plurality of current iteration indicia;

in response to the current iteration outcome being a losing combination, autonomously performing another iteration of the iterative process without user input; and in response to the current iteration outcome being a winning combination:

generate a skill-based game feature on a user interface; and stop iterating through additional wagering games.

14. The non-transitory computer-readable medium of claim 13, wherein the program further causes the at least one computing device to:

subsequent to the iterative process, generate a game of skill on a user interface;

determine whether the game of skill is successful based on a plurality of inputs; and in response to the game of skill being successful, award a particular amount of credits to the current credits value based on a sum of a quantity of credits decreased for losing combinations during the iterative process.

15. The non-transitory computer-readable medium of claim 14, wherein the particular amount of credits is equal to 104% of the sum of the quantity of credits decreased for losing combinations during the iterative process.

16. The non-transitory computer-readable medium of claim 13, wherein the program further causes the at least one computing device to render the wagering game for each iteration in the iterative process on a display at a first speed exceeding a second speed of the wagering game in a single play mode.

17. The non-transitory computer-readable medium of claim 16, wherein the first speed is at least five times faster than the second speed.

18. The non-transitory computer-readable medium of claim 13, wherein the iterative process further comprises:

receiving a user input during the iterative process; and terminating the iterative process on completion of a current iteration wagering game in response to receiving the user input.

* * * * *